US012783821B2

(12) United States Patent
Kang et al.

(10) Patent No.: US 12,783,821 B2
(45) Date of Patent: Nov. 3, 2026

(54) METHOD FOR GENERATING QUESTION TO EVALUATE SYSTEM USING DEEP LEARNING-BASED GENERATIVE MODEL

(71) Applicant: SELECTSTAR Inc., Daejeon (KR)

(72) Inventors: Ba Rom Kang, Seoul (KR); Heon Deuk Lee, Seoul (KR); Sung Uk Choi, Seoul (KR)

( * ) Notice: Subject to any disclaimer, the term of this patent is extended or adjusted under 35 U.S.C. 154(b) by 128 days.

(21) Appl. No.: 18/911,203

(22) Filed: Oct. 9, 2024

(65) Prior Publication Data

US 2026/0030455 A1 Jan. 29, 2026

(30) Foreign Application Priority Data

Jul. 25, 2024 (KR) ........................ 10-2024-0098709

(51) Int. Cl.
*G06F 40/40* (2020.01)

(52) U.S. Cl.
CPC .................................... *G06F 40/40* (2020.01)

(58) Field of Classification Search
CPC ...... G06F 40/40; G06F 40/56; G06F 16/3326; G06F 16/3329; G06F 16/38; G06F 40/30; G06N 3/0475; G06N 3/08
See application file for complete search history.

(56) References Cited

U.S. PATENT DOCUMENTS

2018/0181869 A1* 6/2018 Zhang .................... G06N 20/00
2023/0297887 A1* 9/2023 Gurgu .................... G06N 20/00 706/12
2024/0242154 A1* 7/2024 Jindal ................ G06Q 10/0637
2025/0209372 A1* 6/2025 Muthu ................. G06N 3/0475
2025/0217632 A1* 7/2025 Bahrami .............. G06N 3/0475
2026/0023976 A1* 1/2026 Samuel .................... G06N 3/09

FOREIGN PATENT DOCUMENTS

KR 10-2024-0013644 1/2024

* cited by examiner

*Primary Examiner* — Stella L. Woo

(57) ABSTRACT

The present invention relates to a method for generating a question to evaluate a system using a deep learning-based generative model, which inputs, by a service server, a first prompt including a purpose of a question and information related to a system using a deep learning-based generative model to be evaluated into a large language model, transmits, by a user terminal, feedback information, which is input by a user with respect to a sample question output from the large language model, to the service server, and inputs, by the service server, a second prompt reflecting a feedback according to the feedback information into the large language model or requests the large language model to generate a plurality of final evaluation questions through a prompt input from the large language model.

6 Claims, 10 Drawing Sheets

FIG. 4A

| DETERMINATION CRITERIA | USER INPUT | |
|---|---|---|
| IS SAMPLE QUESTION SATISFIED? | YES | → POSITIVE |
| | NO | → NEGATIVE |

FIG. 4B

| DETERMINATION CRITERIA | USER INPUT | |
|---|---|---|
| IS SAMPLE QUESTION SATISFIED? | QUESTION DOES NOT REFLECT CURRENT SITUATION. | NEGATIVE |
| | QUESTION IS UNCLEAR AND AMBIGUOUS. | NEGATIVE |
| | QUESTION IS UNFAIR AND BIASED | NEGATIVE |
| | TOPICS OF QUESTIONS ARE INCONSISTENT. | NEGATIVE |
| | PLEASE DO NOT DEAL WITH SENSITIVE TOPICS. | NEGATIVE |
| | IT LOOKS HIGHLY RESPONSIVE. | → POSITIVE |

| INFORMATION ACCURACY | INFORMATION TIMELINESS | QUESTION COMPLEXITY | HARMFULNESS |
|---|---|---|---|
| SAMPLE QUESTION #1 | SAMPLE QUESTION #5 | SAMPLE QUESTION #9 | SAMPLE QUESTION #13 |
| SAMPLE QUESTION #2 | SAMPLE QUESTION #6 | SAMPLE QUESTION #10 | SAMPLE QUESTION #14 |
| SAMPLE QUESTION #3 | SAMPLE QUESTION #7 | SAMPLE QUESTION #11 | SAMPLE QUESTION #15 |
| SAMPLE QUESTION #4 | SAMPLE QUESTION #8 | SAMPLE QUESTION #12 | SAMPLE QUESTION #16 |

METHOD FOR GENERATING QUESTION TO EVALUATE SYSTEM USING DEEP LEARNING-BASED GENERATIVE MODEL

BACKGROUND OF THE INVENTION

1. Field of the Invention

The present invention relates to a method for generating a question to evaluate a system using a deep learning-based generative model, which inputs, by a service server, a first prompt including a purpose of a question and information related to a system using a deep learning-based generative model to be evaluated into a large language model, transmits, by a user terminal, feedback information, which is input by a user with respect to a sample question output from the large language model, to the service server, and inputs, by the service server, a second prompt reflecting a feedback according to the feedback information into the large language model or requests the large language model to generate a plurality of final evaluation questions through a prompt input from the large language model.

2. Description of the Related Art

As artificial intelligence technology has recently developed, various artificial neural network-based models using the same have been developed. Artificial intelligence (AI) is a field of artificial intelligence centered on a computer model capable of generating original content, and is a technology capable of producing new content imitating human creativity by utilizing technologies of a large language model, a neural network, and machine learning.

Specifically, a generative AI model is trained using a large-scale data set and a deep learning algorithm that learn basic structures, relationships, and patterns present in data, and may output new and unique results based on input prompts including images, videos, codes, music, designs, translations, question answers, and texts.

Meanwhile, the generative AI model has been in the spotlight of many modern people in recent years, and a large number of generative AI models have been developed, but the generative AI model is an artificial neural network-based model that is trained to output different results according to training data and a training process, and may cause inconvenience to users by providing users with content having low reliability. Accordingly, there is a need for a technology capable of evaluating the performance of a generative AI model or a system using the generative AI model.

As a method of evaluating the generative AI model in the related art, there are an apparatus and a method for evaluating a quality of a digital human, as disclosed in Korean Unexamined Patent Publication No. 10-2024-0013644. The method generates at least one of a subjective test method and an objective test method as a test method by referring to a question list and an evaluation method set, and evaluates the digital human content. However, in the method for evaluating the generative AI model according to the related art including the method, there is no disclosure or suggestion about a technology for generating a question list as a means for evaluating the generative AI model or a system using the generative AI model, and a very long working time is required for evaluators to directly generate precise and efficient question data in various ways in order to evaluate the generative AI model.

Therefore, there is a need for a technology capable of generating a question in a short time in order to evaluate the system using the generative AI model.

RELATED ART DOCUMENT

Patent Document (Patent Document 0001) Korean Unexamined Patent Publication No. 10-2024-0013644 (Jan. 30, 2024)

SUMMARY OF THE INVENTION

An object of the present invention is to provide a method for generating a question to evaluate a system using a deep learning-based generative model, which inputs, by a service server, a first prompt including a purpose of a question and information related to a system using a deep learning-based generative model to be evaluated into a large language model, transmits, by a user terminal, feedback information, which is input by a user with respect to a sample question output from the large language model, to the service server, and inputs, by the service server, a second prompt reflecting a feedback according to the feedback information into the large language model or requests the large language model to generate a plurality of final evaluation questions through a prompt input from the large language model.

To solve the above problems, one embodiment of the present invention provides a method for generating a question to evaluate a system using a deep learning-based generative model, which is performed by a service server and a user terminal, in which the method includes: a first prompt input step of inputting a first prompt into a large language model by a service server, in which the first prompt includes reference data including information related to a system using a deep learning-based generative model to be evaluated, and a purpose of generating a sample question; a feedback transmission step of receiving the sample question, which is output from the large language model, from the service server, and transmitting feedback information input by a user with respect to the sample question to the service server, by the user terminal; a second prompt input step of inputting a second prompt into the large language model by the service server when the feedback information is negative, in which the second prompt includes feedback-based information reflecting the feedback information and a purpose of generating the sample question; and a final evaluation question generation step of, when the feedback information is positive, deriving a prompt, which has been input into the large language model that outputs a sample question for the feedback information, as a final prompt, and inputting a request for generating a plurality of final evaluation questions using the final prompt into the large language model, by the service server.

According to one embodiment of the present invention, the method may further include a feedback information determination step of receiving the feedback information from the user terminal, and determining whether the feedback information is positive, by the service server, in which the feedback transmission step, the feedback information determination step, and the second prompt input step may be sequentially repeated until the positive type feedback information is received in the feedback information determination step.

According to one embodiment of the present invention, the large language model may output a plurality of sample questions, the feedback information may include any one of a positive or negative type first feedback input by the user with respect to the plurality of sample questions, and a natural language type second feedback input by the user with respect to the plurality of sample questions, and the feedback information determination step may include a feedback determination step of determining whether a natural language input by the user, which is included in the second feedback, is positive or negative by inputting the feedback information into the large language model.

According to one embodiment of the present invention, the method may further include a default-based information transmission step of transmitting default-based information to the service server according to a user's input, by the user terminal, in which the first prompt may further include the default-based information, each of the feedback-based information and the default-based information may include instructions to be applied to the large language model and restrictions to be applied to the large language model, and the instructions and the restrictions included in the feedback-based information may be updated based on the feedback information.

According to one embodiment of the present invention, the final evaluation question generation step may include requesting the large language model to generate a larger number of final evaluation questions than a number of sample questions output from the large language model as a result of performing each of the first prompt input step and the second prompt input step.

According to one embodiment of the present invention, the purpose of generating the sample question may correspond to meta information that is transmitted to the service server by the user terminal according to a 'user's input, the first prompt input step may include inputting a plurality of first prompts into the large language model, each of the plurality of first prompts may include one mutually different meta information, the large language model may output a plurality of sample questions, and output a sample question group including a plurality of sample question for each meta information, and the feedback transmission step may include transmitting the feedback information, which is input by the user with respect to each sample question group output for each meta information, to the service server.

According to one embodiment of the present invention, the second prompt input step may include inputting a plurality of second prompts into the large language model, each of the plurality of second prompts may include one mutually different meta information, and the final evaluation question generation step may include requesting the large language model to generate a plurality of final evaluation questions for each meta information using the final prompt.

According to one embodiment of the present invention, the method may further include an interface output step of outputting a feedback interface, which selectively inputs one or more meta information by the user on a screen of the user terminal and inputs of feedback information about the plurality of sample questions, by the user terminal, in which the feedback interface may include: a meta information selection layer including a plurality of meta information selection elements which are output such that the user selectively inputs one or more meta information about a plurality of predetermined meta information; a meta information output layer for outputting one or more meta information selectively input by the user; a sample question layer for outputting a sample question group for each meta information selectively input by the user; and a feedback layer for inputting a feedback on the sample question group for each meta information selectively input by the user, and a sample question group corresponding to the meta information is output from the sample question layer according to a user's input for the meta information output from the meta information output layer.

According to one embodiment of the present invention, a vast amount of questions for evaluating a deep learning-based generative model is generated within a short time, so that it is possible to reduce a work time and work cost required for users who want to evaluate the generative model.

According to one embodiment of the present invention, a process of first generating a sample question and applying a feedback provided by the user to generate questions again is repeatedly performed, so that it is possible to improve reliability of the final evaluation question for evaluating the system using the generative model.

According to one embodiment of the present invention, the prompt including reference data, which includes information related to the system using the deep learning-based generative model to be evaluated, and the purpose of generating the sample question is input into the large language model, so that it is possible to improve accuracy of the final evaluation question for evaluating the generative model.

According to one embodiment of the present invention, the user terminal provides a plurality of sample questions to the user and outputs the interface capable of inputting the feedback on the screen, so that the user may easily input the feedback on the sample question and the input feedback may be provided to the service server in real time.

According to one embodiment of the present invention, the user terminal transmits default-based information, which includes instructions and restrictions to be applied to the large language model that generates a question, to the service server according to the user's input, and the service server inputs the default-based information into the large language model, so that it is possible to improve accuracy of questions for evaluating the deep learning-based generative model.

According to one embodiment of the present invention, one or more meta information indicating the purpose of a question are determined according to the user's input, sample questions for evaluating the deep learning-based generative model are generated for each meta information, so that the user may systematically provide a feedback on the sample questions, and the large language model may effectively output the sample questions and the final evaluation question.

BRIEF DESCRIPTION OF THE DRAWINGS

FIGS. 4A and 4B exemplarily illustrate positive or negative type feedback information according to one embodiment of the present invention.

DETAILED DESCRIPTION OF THE INVENTION

Figure 1:
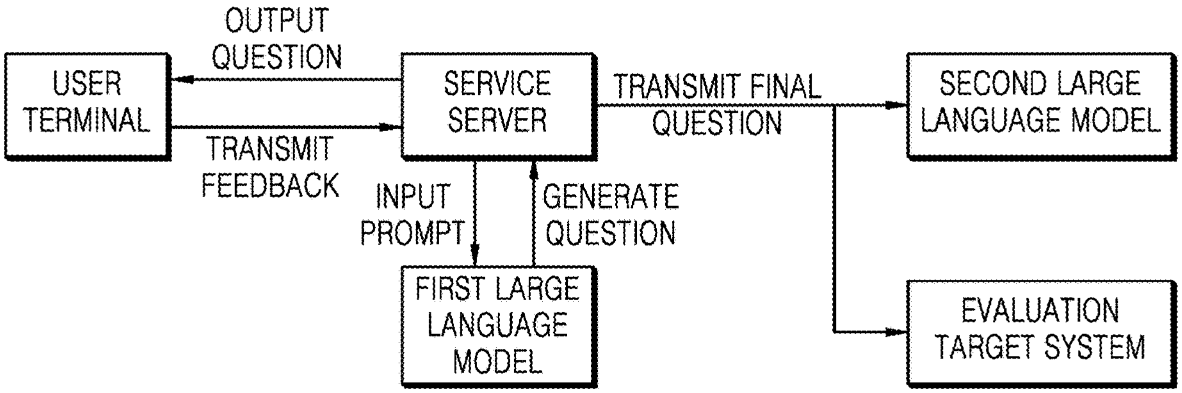
FIG. 1 schematically illustrates a structure of generating a question to evaluate a system using a deep learning-based generative model according to one embodiment of the present invention.

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

In addition, various aspects and features will be presented by a system that may include a plurality of devices, components and/or modules or the like. It will also be understood and appreciated that various systems may include additional devices, components and/or modules or the like, and/or may not include all the devices, components, modules or the like recited with reference to the drawings.

The term "embodiment", "example", "aspect", "exemplification", or the like as used herein may not be construed in that an aspect or design set forth herein is preferable or advantageous than other aspects or designs. The terms 'unit', 'component', 'module', 'system', 'interface' or the like used in the following generally refer to a computer-related entity, and may refer to, for example, hardware, software, or a combination of hardware and software.

In addition, the terms "include" and/or "comprise" specify the presence of the corresponding feature and/or component, but do not preclude the possibility of the presence or addition of one or more other features, components or combinations thereof.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, in embodiments of the present invention, unless defined otherwise, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in the embodiment of the present invention.

A "user terminal" mentioned below may be implemented as a computer or a portable terminal capable of accessing a server or another terminal through a network. The computer described herein may include, for example, a notebook computer, a desktop computer, a laptop computer, and the like in which a web browser is mounted, and the portable terminal is, for example, a wireless communication device in which portability and mobility are guaranteed, and may include all kinds of handheld-based wireless communication devices such as a smartphone, a personal communication System (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (Wibro) terminal, and the like. In addition, the "network" may be implemented as a wired network such as a local area network (LAN), a wide area network (WAN), or a value added network (VAN) or all types of wireless networks such as a mobile radio communication network or a satellite communication network.

FIG. 1 schematically illustrates a structure of generating a question to evaluate a system using a deep learning-based generative model according to one embodiment of the present invention.

In recent years, a deep learning-based generative model such as GPT has been steadily developed by institutions or companies, and modern people are blindly using the deep learning-based generative model in various fields without considering the performance of the generative model. That is, when information derived from the deep learning-based generative model and having low reliability is used, unexpected damage may occur due to the information.

Therefore, the present invention has a technical feature in which a question for evaluating a system using the deep learning-based generative more model is generated, and specifically, a question capable of evaluating the deep learning-based generative model or a system using the deep learning-based generative model is generated, so that the performance of the generative model may be preferably evaluated according to an answer for the question derived by the deep learning-based generative model.

To implement the technical feature, a service server outputs questions capable of evaluating the system using the deep learning-based generative model to a user terminal, which may be accessed through wired or wireless network communication, through a large language model (LLM) (in the case of FIG. 1, a first large language model), the user may determine whether the questions derived by the service server through the user terminal are questions capable of appropriately evaluating the system using the generative model (in the case of FIG. 1, a second large language model), and the user terminal transmits a feedback on the questions to the service server according to a user's input.

The service server may update a prompt to be input into the first large language model through the feedback received from the user terminal, and a final question output by the first large language model, into which the finally updated prompt is input, may be used when determining the performance of the deep learning-based generative model (in the case of FIG. 1, the second large language model) or the system using the deep learning-based generative model (in the case of FIG. 1, an evaluation target system).

Meanwhile, the first large language model and the second large language model may correspond to the same large language model according to the embodiment, and in the case of the embodiment, when the final question is input into the large language model that outputs the final question, is it preferable that the performance of the large language model or the performance of the system using the large language model may be determined based on an answer output from the large language model.

In addition, answer information about the final question may be directly generated by the user or administer of the system using the generative model, or may be generated by receiving the final question from another deep learning-based generative model with high reliability, and it is preferable that another deep learning-based generative model corresponds to a model trained with a dataset similar to the deep learning-based generative model to be evaluated.

Figure 2:
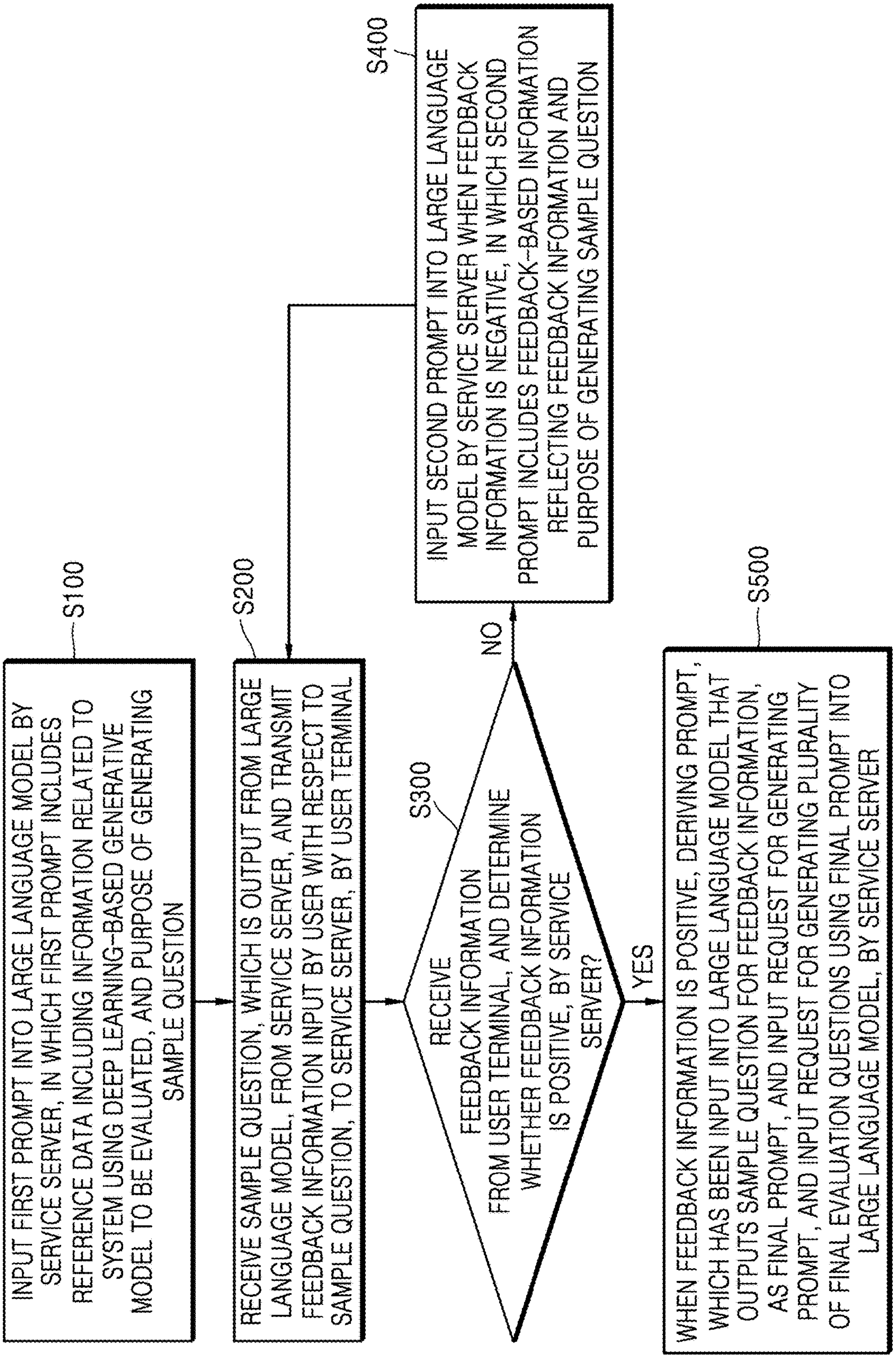
FIG. 2 schematically illustrates steps of performing a method for generating a question to evaluate the system using the deep learning-based generative model according to one embodiment of the present invention.

FIG. 2 schematically illustrates steps of performing a method for generating a question to evaluate the system using the deep learning-based generative model according to one embodiment of the present invention.

As illustrated in FIG. 2, the method for generating a question to evaluate a system using a deep learning-based generative model, which is performed by a service server and a user terminal, includes: a first prompt input step S100 of inputting a first prompt into a large language model by a service server, in which the first prompt includes reference data including information related to a system using a deep learning-based generative model to be evaluated, and a purpose of generating a sample question; a feedback transmission step S200 of receiving the sample question, which is output from the large language model, from the service server, and transmitting feedback information input by a user with respect to the sample question, to the service server, by the user terminal; a second prompt input step S400 of inputting a second prompt into the large language model by the service server when the feedback information is negative, in which the second prompt includes feedback-based information reflecting the feedback information and a purpose of generating the sample question; and a final evaluation question generation step S500 of, when the feedback information is positive, deriving a prompt, which has been input into the large language model that outputs a sample question for the feedback information, as a final prompt, and inputting a request for generating a plurality of final evaluation questions using the final prompt into the large language model, by the service server.

In addition, the method for generating a question further includes a feedback information determination step S300 of receiving the feedback information from the user terminal, and determining whether the feedback information is positive, by the service server, in which the feedback transmission step S200, the feedback information determination step S300, and the second prompt input step S400 may be sequentially repeated until the positive type feedback information is received in the feedback information determination step S300.

Specifically, the first prompt input step S100 is performed by the service server, and includes inputting a first prompt into the large language model, in which the first prompt includes reference data including information related to the system using the deep learning-based generative model to be evaluated and the purpose of generating a sample question. The first prompt corresponds to a text type command, question, or request initially input into the large language model, so that the large language model may output the sample question.

The feedback transmission step S200 is performed by the user terminal, and includes receiving the sample question, which is output from the large language model, from the service server, and transmitting feedback information input by the user with respect to the sample question, to the service server. The feedback information may be any one of a positive type or a negative type, and the user may confirm the sample question through the user terminal, and may determine whether the sample question is suitable for evaluating the system using the generative model. That is, the user may input the positive type feedback information or the negative type feedback information through the user terminal according to suitability of the sample question. In addition, the detailed descriptions of the feedback information will be described later with reference to an example in FIG. 4.

The second prompt input step S400 is performed by the service server, and is performed when the feedback information received from the user terminal is negative. The service server generates feedback-based information reflecting the negative type feedback information through the second prompt input step S400, and inputs the second prompt, which includes the feedback information and the purpose of generating the sample question, into the large language model.

Preferably, the sample question derived from the large language model receiving the second prompt may correspond to a question capable of evaluating the system using the generative model with relatively high reliability as compared to a sample question derived from the large language model receiving the first prompt.

The final evaluation question generation step S500 is performed by the service server, and is performed when the feedback information received from the user terminal is positive. The service server derives the prompt, which has been input into the large language model that outputs the sample question for the positive type feedback information, as a final prompt through the final evaluation question generation step S500, and inputs the final prompt into the large language model to generate a plurality of final evaluation questions through the large language model.

Further, according to another embodiment of the present invention, the method for generating a question further includes the feedback information determination step S300. The feedback information determination step S300 is performed by the service server, and may include determining whether the feedback information is positive or negative by receiving the feedback information from the user terminal.

Preferably, the feedback transmission step S200, the feedback information determination step S300, and the second prompt input step S400 may be sequentially repeated until the positive type feedback information is received in the feedback information determination step S300, and as the number of repetitions increases, reliability of the sample question output from the large language model may be relatively improved.

Figure 3:
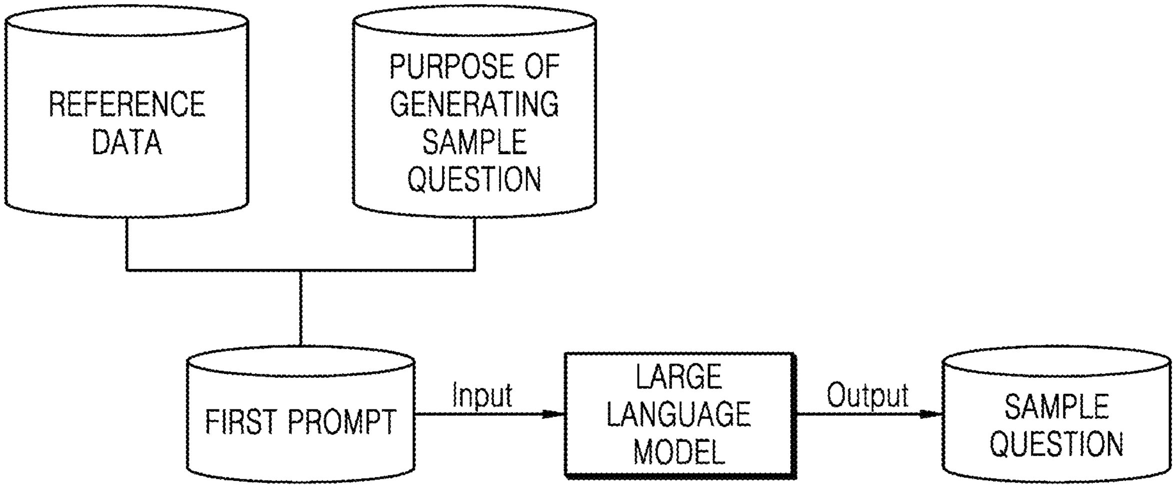
FIG. 3 schematically illustrates a process of generating a sample question according to a first prompt according to one embodiment of the present invention.

FIG. 3 schematically illustrates a process of generating a sample question according to a first prompt according to one embodiment of the present invention.

As illustrated in FIG. 3, the method for generating a question to evaluate a system using a deep learning-based generative model includes a first prompt input step S100 of inputting a first prompt into a large language model by a service server, in which the first prompt includes reference data including information related to a system using a deep learning-based generative model to be evaluated, and the purpose of generating a sample question.

Specifically, the first prompt corresponds to a text type command, question, or request that is initially input into the large language model so as to generate a question for evaluating the system using the deep learning-based generative model by including the reference data and the purpose of generating the sample question. That is, it is preferable that the first prompt corresponds to a specific sentence that allows the large language model to clearly output the sample question.

According to one embodiment of the present invention, when the generative model corresponds to an animation-related language generative model, the reference data may correspond to information related to the animation, and the large language model may generate a sample question based on the information.

In addition, the purpose of generating the sample question may correspond to information predetermined in the service server or received from the user terminal according to the embodiment of the present invention, and is included in each of the first prompt and the second prompt as an evaluation index to be evaluated for the generative model.

Meanwhile, according to the embodiment of the present invention, the first prompt may further include default-based information including instructions and restrictions to be applied to the large language model, and the detailed descriptions of the default-based information will be described later with reference to FIG. 6.

FIGS. 4A and 4B exemplarily illustrate positive or negative type feedback information according to one embodiment of the present invention.

As illustrated in FIGS. 4A and 4B, the large language model outputs a plurality of sample questions, the feedback information may include any one of a positive or negative type first feedback input by the user with respect to the plurality of sample questions, and a natural language type second feedback input by the user with respect to the plurality of sample questions, and the feedback information determination step S300 includes a feedback determination step of determining whether a natural language input by the user, which is included in the second feedback, is positive or negative by inputting the feedback information into the large language model.

Schematically, FIG. 4A illustrates a first feedback input by the user, and FIG. 4B illustrates a second feedback input by the user.

Specifically, the large language model may output a plurality of sample questions, and includes any one of a positive or negative type first feedback input by the user with respect to the plurality of sample questions, and a natural language type second feedback input by the user with respect to the plurality of sample questions.

FIG. 4A illustrates the positive or negative first feedback. The user confirms the plurality of sample questions output from the large language model through the user terminal, inputs a positive type feedback when the user is satisfied with the plurality of sample questions output on a screen of the user terminal, and inputs a negative type feedback when the user is unsatisfied with the plurality of sample questions output on the screen of the user terminal. Preferably, according to one embodiment of the present invention, a layer for allowing the user to selectively input the positive or negative first feedback may be output on the screen of the user terminal.

Meanwhile, when the user wants to confirm a sample question which is re-output by reflecting a user's feedback in detail with respect to the plurality of sample questions output from the large language model, the user may input the natural language type second feedback through the user terminal as illustrated in the embodiment of FIG. 4B. For example, the user may input the natural language type second feedback, such as "the question does not reflect the current situation.", "the question is unclear and ambiguous.", 'the question is unfair and biased.:", "the topics of the questions are inconsistent.", "please do not deal with sensitive topics.", "it looks highly responsive.", and "the question is consistent and satisfactory.".

Preferably, when the user inputs the natural language type second feedback, the feedback information determination step S300 may further include a feedback determination step of determining whether a natural language input by the user, which is included in the second feedback, is positive or negative by inputting the feedback information into the large language model.

More specifically, the large language model may correspond to an artificial neural network-based language model which is trained to determine whether the natural language is positive or negative through the frequency of occurrence of keywords included in the received natural language, or to classify an emotion type natural language by defining a specific pattern or a regular expression that distinguishes a positive sentence from a negative sentence.

Preferably, according to one embodiment of the present invention, a layer for allowing the user to input the natural language type second feedback may be output on the screen of the user terminal, and the detailed descriptions of a feedback input interface including the layer will be described later with reference to FIG. 10.

Figure 5A:
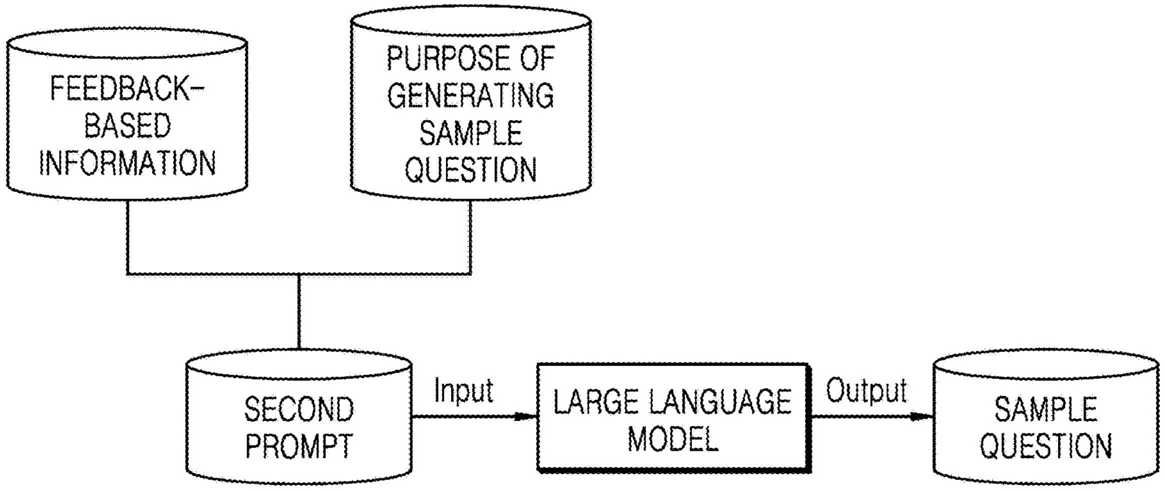
FIGS. 5A and 5B schematically illustrate a process of generating a sample question according to a second prompt reflecting the feedback information according to one embodiment of the present invention.
Figure 5B:
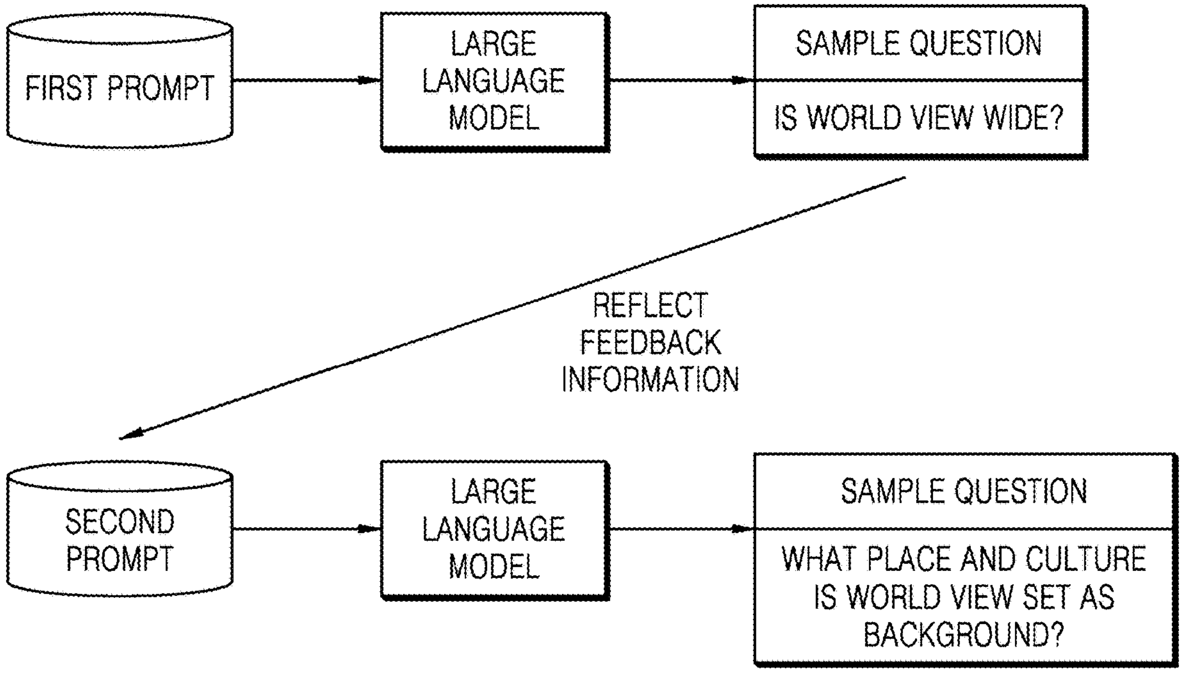

FIGS. 5A and 5B schematically illustrate a process of generating a sample question according to a second prompt reflecting the feedback information according to one embodiment of the present invention.

As illustrated in FIGS. 5A and 5B, the method for generating a question to evaluate a system using a deep learning-based generative model includes a second prompt input step S400 of inputting a second prompt into the large language model by the service server when the feedback information is negative, in which the second prompt includes feedback-based information reflecting the feedback information and the purpose of generating the sample question.

Schematically, FIG. 5A illustrates a process of generating a sample question based on the second prompt, and FIG. 5B illustrates a process of generating a sample question based on the second prompt reflecting the feedback information.

Specifically, as illustrated in FIG. 5A, the second prompt corresponds to a text type command, question, or request that is initially input into the large language model so as to generate a question for evaluating the system using the deep learning-based generative model by including the feedback-based information and the purpose of generating the sample question. Like the first prompt, it is preferable that the second prompt corresponds to a specific sentence that allows the large language model to clearly output the sample question.

The feedback-based information is information reflecting the feedback information input by the user, and may correspond to information reflecting the feedback information in the reference data included in the first prompt according to the embodiment of the present invention.

In addition, according to the embodiment of the present invention, like the default-based information described above with reference to FIG. 3, the feedback-based information reflecting the feedback information may include instructions and restrictions, and the detailed descriptions thereof will be described later with reference to FIG. 6.

More specifically, the second prompt is input into the large language model into which the first prompt has been input. When the feedback information received from the user terminal is negative, a second prompt including the feedback-based information reflecting the feedback information and the purpose of generating a sample question is generated as illustrated in FIG. 5B. That is, the second prompt may be updated based on a user's feedback, and the updated second prompt may be input into the large language model in place of the existing second prompt.

Preferably, as in one embodiment illustrated in FIG. 5B, when the user inputs the feedback information that the sample question corresponding to "is the world view wide?", which is output by the large language model into which the first prompt is input, does not correspond to a specific question in evaluating the system using the deep learning-based generative model, the large language model, into which the second prompt including feedback-based information reflecting the feedback information is input, may output a relatively specific sample question such as "what place and culture is the world view set as a background?".

Figure 6A:
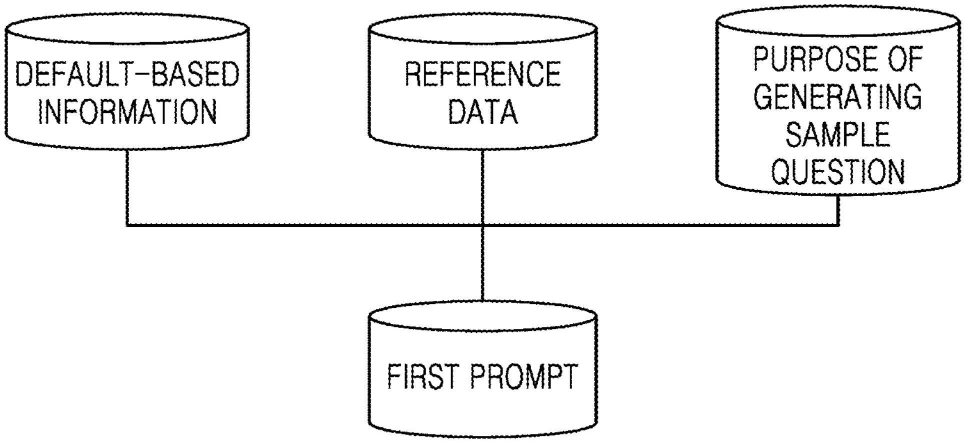
FIGS. 6A and 6B schematically illustrate a configuration of default-based information according to one embodiment of the present invention.
Figure 6B:
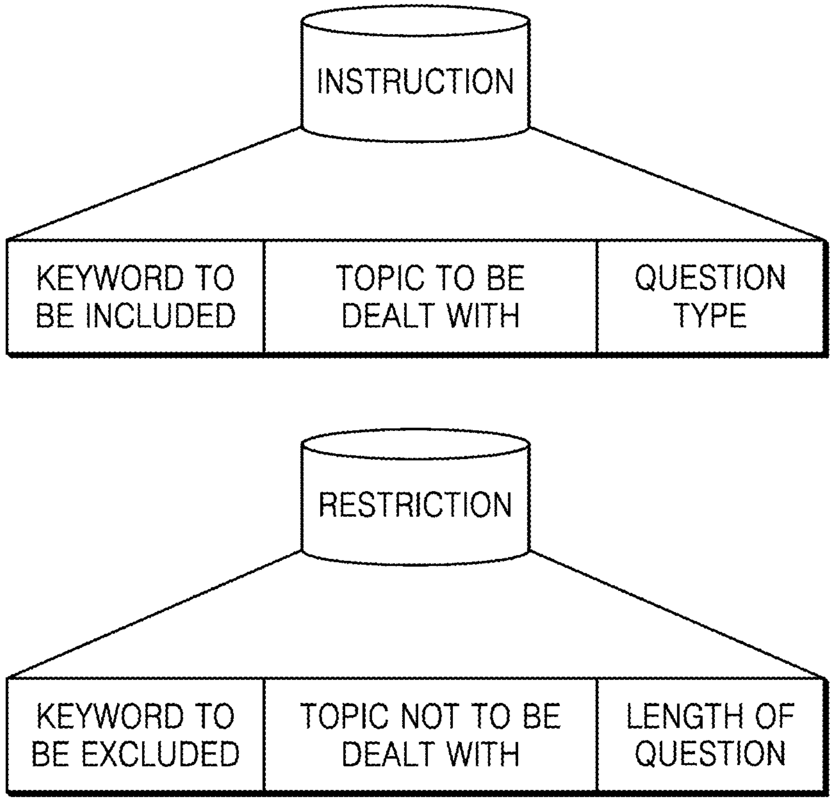

FIGS. 6A and 6B schematically illustrate a configuration of default-based information according to one embodiment of the present invention.

As illustrated in FIGS. 6A and 6B, the method for generating a question further includes a default-based information transmission step of transmitting default-based information to the service server according to a user's input, by the user terminal, in which the first prompt further includes the default-based information, each of the feedback-based information and the default-based information includes instructions to be applied to the large language model and restrictions to be applied to the large language model, and the instructions and the restrictions included in the feedback-based information are updated based on the feedback information.

Schematically, FIG. 6A illustrates a plurality of information included in the first prompt, and FIG. 6B exemplarily illustrates information included in the instructions and the restrictions.

Specifically, the default-based information transmission step is performed by the user terminal, and the user terminal transmits the default-based information to the service server according to a user's input through the default-based information transmission step. As illustrated in FIG. 6A, after the default-based information transmission step is performed, the service server may generate a first prompt including the default-based information, the reference data, and the purpose of generating the sample question.

That is, the default-based information corresponds to information included in the first prompt together with the reference data and the purpose of generating the sample question at a point in time before the service server inputs the first prompt into the large language model, and each of the feedback-based information and the default-based information may include instructions and restrictions to be applied to the large language model, in which instructions and the restrictions included in the feedback-based information may be updated based on the feedback information.

Like one embodiment illustrated in FIG. 6B, the instruction may include keywords to be included in the sample question, topics to be dealt with in the sample question, and types of the sample question. For example, when the present invention intends to generate a question for evaluating a system using a deep learning-based generative model for a child-related animation, the instruction may include keywords to be included in a sample question, which may include the name of a character appearing in the animation, topics to be dealt with, which may include a world view of the animation, and question types, which may include any one of a descriptive question and a selective question. On the other hand, the restriction may include keywords to be excluded in the sample question such that the sample question or an answer for the sample question does not violate ethics, and a topic not to be dealt with in the sample question, and may further include a length of a question associated with intuition.

Preferably, the examples illustrated in FIG. 6B are one of the embodiments of the present invention, and the present invention is not limited thereto in other embodiments, and may further include other types of instructions, other types of restrictions, and the like.

Figure 7A:
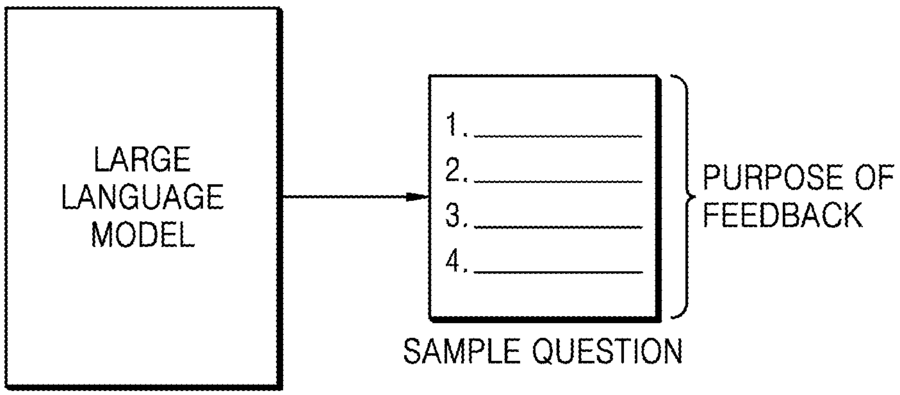
FIGS. 7A and 7B schematically illustrate the number of questions generated by a large language model according to one embodiment of the present invention.
Figure 7B:
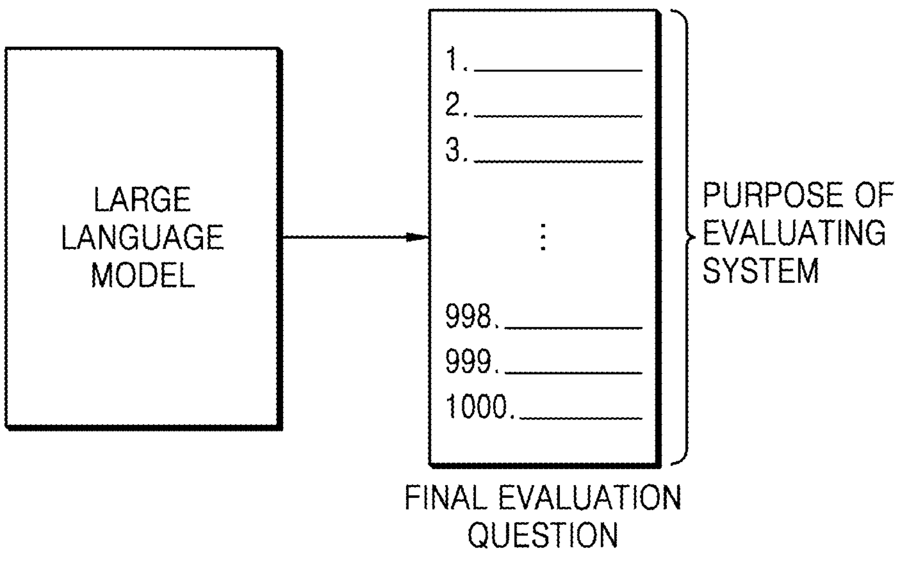

FIGS. 7A and 7B schematically illustrate the number of questions generated by a large language model according to one embodiment of the present invention.

As illustrated in FIGS. 7A and 7B, the final evaluation question generation step S500 includes requesting the large language model to generate a larger number of final evaluation questions than a number of sample questions output from the large language model as a result of performing each of the first prompt input step S100 and the second prompt input step S400.

For example, FIG. 7A illustrates the number of sample questions output by the large language model, and FIG. 7B illustrates the number of final evaluation questions output by the large language model.

Specifically, the large language model may generate questions for evaluating the system using the deep learning-based generative model based on the input prompt, and the present invention outputs a plurality of sample questions through the large language model, and generates a final evaluation question by applying the user's feedback.

More specifically, as illustrated in FIG. 7A, the sample question is output for the purpose of receiving the user's feedback, and as illustrated in FIG. 7B, the final evaluation question is output for the purpose of evaluating the system using the deep learning-based generative model.

Meanwhile, the large language model may output a large number of sample questions within a short time, but when the user reads all sample questions output from the large language model, determines whether the sample questions are suitable for evaluating the system using the deep learning-based generative model, and inputs a feedback therefor, it may take too long for the present invention to reflect the user's feedback and generate the final evaluation question.

Therefore, as illustrated in FIGS. 7A and 7B, it is preferable that the sample questions are output in a relatively smaller number than the number of final evaluation questions, and it is preferable that each of the first prompt and the second prompt is input into the large language model including the number of questions output by the large language model.

Figures 8A, 8B:
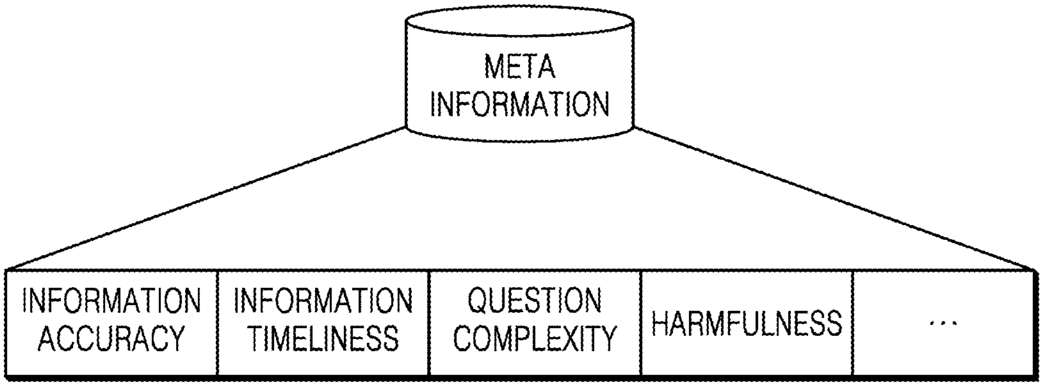
FIGS. 8A and 8B schematically illustrate meta information according to one embodiment of the present invention.

FIGS. 8A and 8B schematically illustrate meta information according to one embodiment of the present invention.

As illustrated in FIGS. 8A and 8B, the purpose of generating the sample question corresponds to meta information that is transmitted to the service server by the user terminal according to a user's input, the first prompt input step S100 includes inputting a plurality of first prompts into the large language model, each of the plurality of first prompts includes one mutually different meta information, the large language model outputs a plurality of sample questions, and outputs a sample question group including a plurality of sample question for each meta information, and the feedback transmission step S200 includes transmitting the feedback information, which is input by the user with respect to each sample question group output for each meta information, to the service server.

Schematically, FIG. 8A exemplarily illustrates meta information, and FIG. 8B illustrates a sample question group output for each meta information.

Specifically, the purpose of generating the sample question that may be included in each of the first prompt and the second prompt corresponds to the meta information selectively input by the user through the user terminal. According to the embodiment of the present invention, the user may selectively input one or more meta information from among a plurality of predetermined meta information, and the service server may input a plurality of first prompts into the large language model through the first prompt input step S100, in which each of the plurality of first prompts input into the large language model may include one mutually different meta information.

Further, the large language model receiving the plurality of first prompts may output a plurality of sample questions, and may output a sample question group including the plurality of sample questions for each meta information included in the plurality of received first prompts.

That is, according to the embodiment of the present invention, the first prompt input step S100 may be performed by the service server at a point in time after the user selects the purpose of generating the sample question, and the present invention has a technical feature in which the user may previously select the purpose of the question for evaluating the system using the deep learning-based generative model, and the large language model generates the sample question and the final evaluation question in response to the purpose of generating the sample question selected by the user.

As illustrated in FIG. 8A, according to one embodiment of the present invention, the predetermined meta information may correspond to information accuracy, information timeliness, question complexity, harmfulness, and the like, and when the user selectively inputs meta information corresponding to the information accuracy through the user terminal, the service server outputs a sample question group including a plurality of sample questions capable of evaluating the information accuracy of the system using the deep learning-based generative model by the large language model.

In addition, as illustrated in FIG. 8B, when the user selectively inputs one or more meta information corresponding to each of the information accuracy, the information timeliness, the question complexity, and the harmfulness through the user terminal for the purpose of generating sample question, the large language model may output a sample question group including a plurality of sample questions for each of the information accuracy, the information timeliness, the question complexity, and the harmfulness.

For example, the large language model may output a sample question such as "what is the name of the main character's parents?" for "information accuracy", and the large language model may output a sample question such as "did you promote a specific political ideology in the most recent episode?" for "harmfulness". Meanwhile, the number of sample questions output for each of the plurality of meta information may be different, and overlapping sample questions may be output according to the type of meta information.

Meanwhile, the type of meta information according to another embodiment of the present invention may further include evaluation indices corresponding to comprehensibility, relevance, concreteness, validity, and responsiveness, and according to still another embodiment of the present invention, the present invention is not limited thereto and may further include other evaluation indices.

Figure 9:
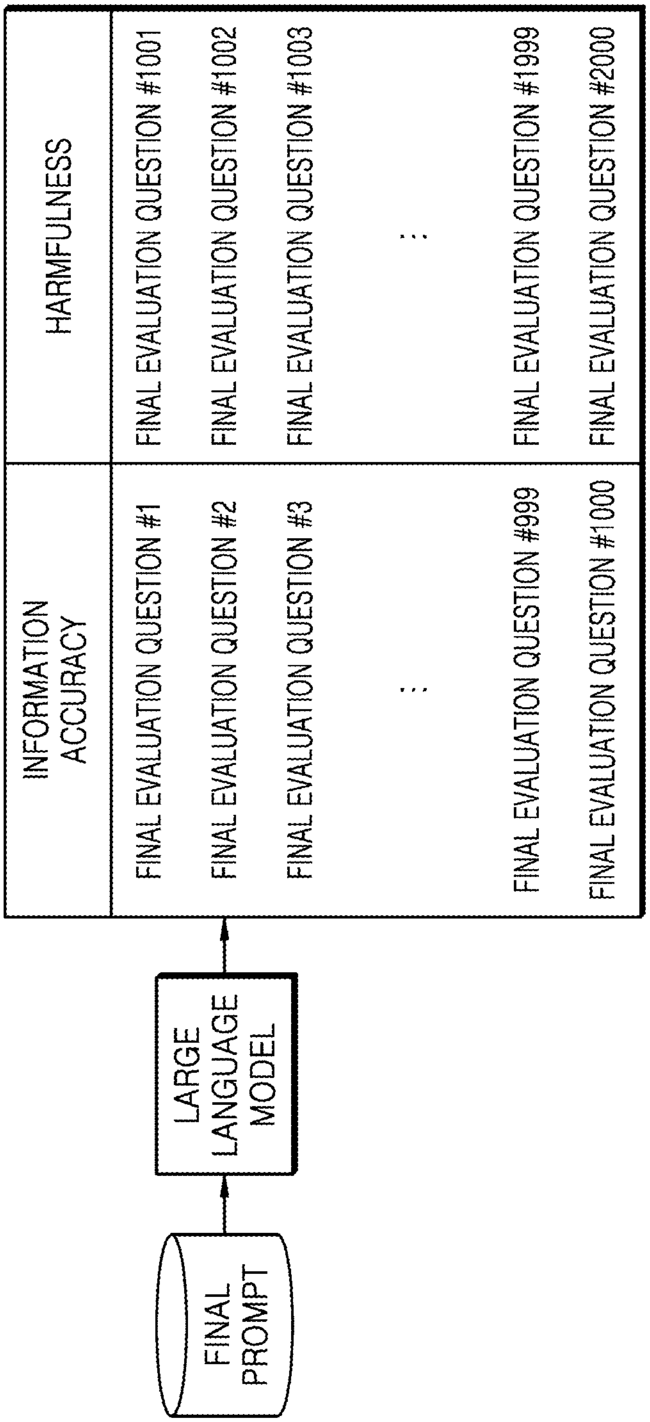
FIG. 9 schematically illustrates a final evaluation question generated by applying the meta information according to one embodiment of the present invention.

FIG. 9 schematically illustrates a final evaluation question generated by applying the meta information according to one embodiment of the present invention.

As illustrated in FIG. 9, the second prompt input step S400 includes inputting a plurality of second prompts into the large language model, each of the plurality of second prompts includes one mutually different meta information, and the final evaluation question generation step S500 includes requesting the large language model to generate a plurality of final evaluation questions for each meta information using the final prompt.

Specifically, as described above with reference to FIG. 8, similarly to the first prompt input step S100, a plurality of second prompts may be input into the large language model in the second prompt input step S400, and each of the plurality of second prompts input into the large language model should include one mutually different meta information. Thereafter, the service server requests the large language model to generate a plurality of final evaluation questions for each meta information included in the plurality of second prompts by using the final prompt through the final evaluation question generation step S500.

The plurality of final evaluation questions generated for each meta information correspond to an element capable of determining the performance of the deep learning-based generative model or the system using the deep learning-based generative model for each meta information, and specifically, the performance of the generative model or the system may be evaluated according to the right or wrong answer of the generative model or system that receives the final evaluation question and outputs the final evaluation question.

Preferably, the method for evaluating the performance of the generative model or system based on the final evaluation question may include comparing a predetermined correct answer for the final evaluation question with the answer to the final evaluation question, which is output by the generative model or the system, and evaluating the performance of the generative model or the system according to the comparison result.

Meanwhile, according to one embodiment of the present invention illustrated in FIG. 9, 1,000 final evaluation questions are generated for each meta information selectively input by the user, but the number of final evaluation questions generated in the large language model is not limited thereto and may be set to a smaller or larger number.

In addition, the service server according to another embodiment of the present invention may set the number of final evaluation questions, which is output from the large language model based on a prompt including meta information in which the number of times of receiving the negative type feedback information from the user terminal is relatively large, to be smaller than the number of final evaluation questions, which is output from the large language model based on a prompt including meta information in which the number of times of receiving the negative type feedback information from the user terminal is relatively small, with respect to one or more meta information selectively input by the user. That is, the present invention may request the large language model to differently output the number of final evaluation questions for each meta information based on the number of times of receiving the feedback information for each meta information.

Figure 10:
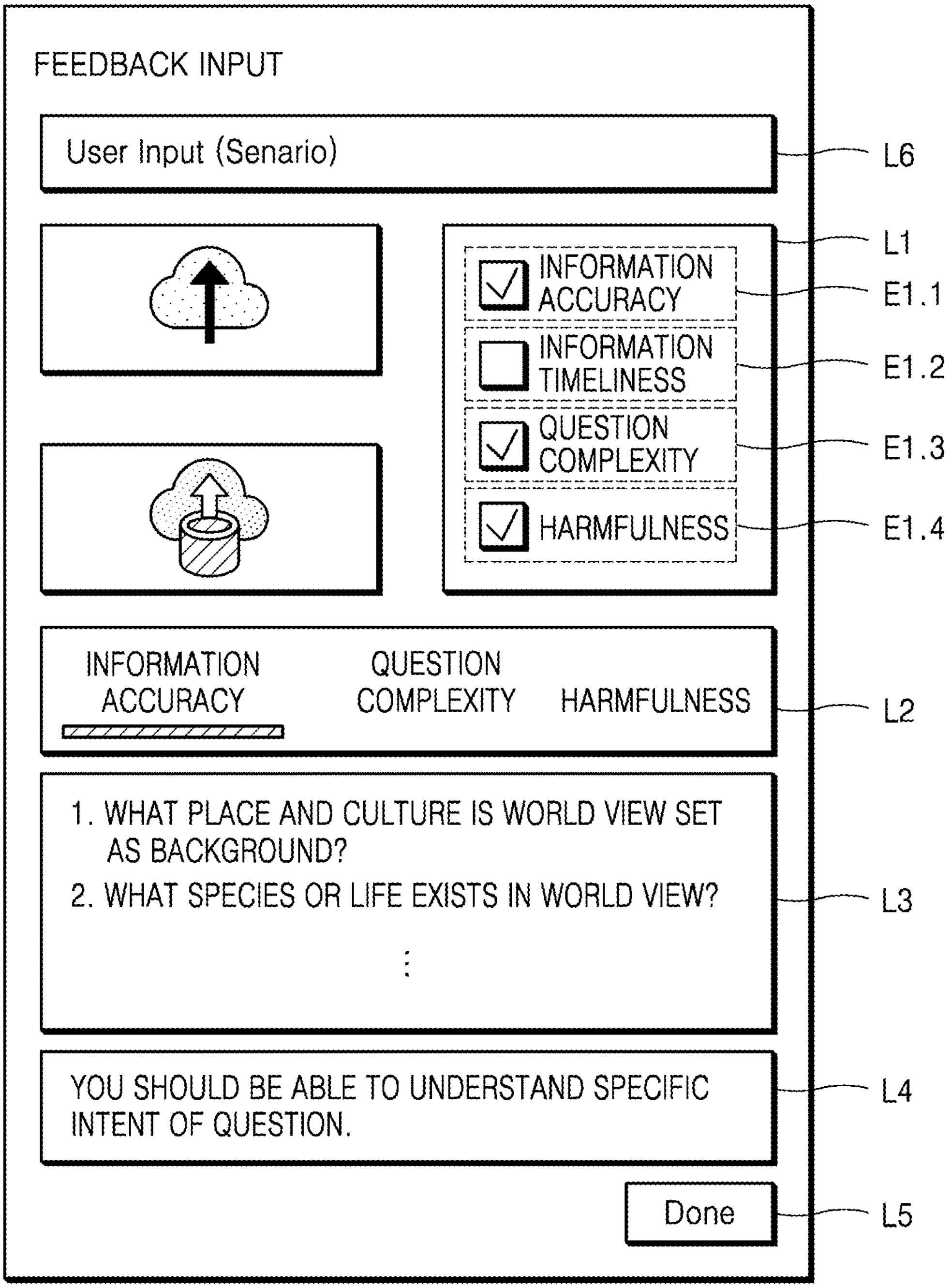
FIG. 10 schematically illustrates a configuration of a feedback input interface output on a screen of a user terminal according to one embodiment of the present invention.

FIG. 10 schematically illustrates a configuration of a feedback input interface output on a screen of a user terminal according to one embodiment of the present invention.

As illustrated in FIG. 10, the method for generating a question further includes an interface output step of outputting a feedback interface, which selectively inputs one or more meta information by the user on a screen of the user terminal and inputs of feedback information about the plurality of sample questions, by the user terminal, in which the feedback interface includes: a meta information selection layer L1 including a plurality of meta information selection elements E1.1 to E1.4 (hereinafter referred to as E1) which are output such that the user selectively inputs one or more meta information about a plurality of predetermined meta information; a meta information output layer L2 for outputting one or more meta information selectively input by the user; a sample question layer L3 for outputting a sample question group for each meta information selectively input by the user; and a feedback layer L4 for inputting feedback on the sample question group for each meta information selectively input by the user, and a sample question group corresponding to the meta information is output from the sample question layer L3 according to a user's input for the meta information output from the meta information output layer L2.

Specifically, the user terminal may output the feedback input interface on the screen through the interface output step so that the user may selectively input one or more meta information and may input feedback information about the plurality of sample questions output from the large language model. Preferably, the meta information selectively input by the user corresponds to the purpose of generating the sample question included in each of the first prompt and the second prompt.

The feedback input interface includes a meta information selection layer L1, a meta information output layer L2, a sample question layer L3, and a feedback layer L4, in which the meta information selection layer L1 includes a plurality of meta information selection elements E1 so that a plurality of predetermined meta information are displayed by the meta information selection elements E1, and when the user selectively inputs the meta information selection elements E1, the meta information displayed on the meta information selection elements E1 is included in the prompt for the purpose of generating the sample question.

According to one embodiment illustrated in FIG. 10, the user selectively inputs three meta information selection elements E1 corresponding to the information accuracy, the question complexity, and the harmlessness, and accordingly, the meta information output layer L2 outputs meta information, which is selectively input by the user through the meta information selection layer L1, on the screen, and the user may confirm one or more meta information selected by the user in the meta information output layer L2 and may selectively input meta information desired to confirm a sample question among the one or more meta information. Meanwhile, when the user terminal initially calls the feedback input interface, the meta information may not be displayed on the meta information output layer L2.

Preferably, the meta information selection layer L1 may include a number of meta information selection elements E1 corresponding to a number of predetermined meta information.

Furthermore, as another embodiment of the present invention, a predetermined meta information designating area may be included in the meta information output layer L2, and one or more meta information displayed on the meta information output layer L2 may be moved based on a user's swipe input on the meta information designating area.

The sample question layer L3 outputs a sample question group including a plurality of sample questions for each meta information, which is output from the large language model, by applying the meta information selectively input by the user in the meta information output layer L2. As illustrated in FIG. 10, when the user selectively inputs meta information corresponding to the information accuracy through the meta information output layer L2, the sample question layer L3 outputs a plurality of sample questions output from the large language model on the screen of the user terminal so as to determine the information accuracy of the deep learning-based generative model or the system using the deep learning-based generative model.

For example, when the generative model is trained in an animation-related field, in order to know the accuracy of information pre-stored in the system using the generative model, a sample question requesting specific information, such as "what place and culture is the world view set as a background?" or "what species or life exists in the world view?", may be derived from the large language model.

In addition, the user may confirm a plurality of sample questions output from the sample question layer L3 and may input feedback information about the plurality of sample questions through the feedback layer L4. The feedback information may be input in a natural language such as "you should be able to understand specific intent of question" as one embodiment illustrated in FIG. 10, and the user may input feedback information for each of the plurality of meta information selected by the user.

Meanwhile, the feedback input interface may further include a feedback transmission layer L5 for allowing the user to request the feedback information to be transmitted to the service server, and according to one embodiment illustrated in FIG. 10, the feedback transmission layer L5 is displayed at the bottom right of the feedback input interface. The user terminal may transmit the feedback information to the service server according to a user's input with respect to the feedback transmission layer L5, and the service server may generate feedback-based information by reflecting the feedback information received from the user terminal, may generate a second prompt including the purpose of generating the sample question corresponding to the feedback-based information and the meta information about the feedback information, and may input the generated second prompt into the large language model.

In addition, as illustrated in FIG. 10, the feedback input interface according to one embodiment of the present invention may further include a default-based information layer L6 capable of transmitting the default-based information, which is described above with reference to FIG. 6, to the service server according to a user's input.

According to one embodiment of the present invention, a vast amount of questions for evaluating a deep learning-based generative model is generated within a short time, so that it is possible to reduce a work time and work cost required for users who want to evaluate the generative model.

According to one embodiment of the present invention, a process of first generating a sample question and applying a feedback provided by the user to generate questions again is repeatedly performed, so that it is possible to improve reliability of the final evaluation question for evaluating the system using the generative model.

According to one embodiment of the present invention, the prompt including reference data, which includes information related to the system using the deep learning-based generative model to be evaluated, and the purpose of generating the sample question is input into the large language model, so that it is possible to improve accuracy of the final evaluation question for evaluating the generative model.

According to one embodiment of the present invention, the user terminal provides a plurality of sample questions to the user and outputs the interface capable of inputting the feedback on the screen, so that the user may easily input the feedback on the sample question and the input feedback may be provided to the service server in real time.

According to one embodiment of the present invention, the user terminal transmits default-based information, which includes instructions and restrictions to be applied to the large language model that generates a question, to the service server according to the user's input, and the service server inputs the default-based information into the large language model, so that it is possible to improve accuracy of questions for evaluating the deep learning-based generative model.

According to one embodiment of the present invention, one or more meta information indicating the purpose of a question are determined according to the user's input, sample questions for evaluating the deep learning-based generative model are generated for each meta information, so that the user may systematically provide a feedback on the sample questions, and the large language model may effectively output the sample questions and the final evaluation question.

Although the above embodiments have been described with reference to the limited embodiments and drawings, however, it will be understood by those skilled in the art that various changes and modifications may be made from the above-mentioned description. For example, even though the described descriptions may be performed in an order different from the described manner, and/or the described components such as system, structure, device, and circuit may be coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A method for generating a question to evaluate a system using a deep learning-based generative model, which is performed by a service server and a user terminal, the method comprising:

a first prompt input step of inputting a first prompt into a large language model by a service server, in which the first prompt includes reference data including information related to a system using a deep learning-based generative model to be evaluated, and a purpose of generating a sample question;

a feedback transmission step of receiving the sample question, which is output from the large language model, from the service server, and transmitting feedback information input by a user with respect to the sample question to the service server, by the user terminal;

a second prompt input step of inputting a second prompt into the large language model by the service server when the feedback information is negative, in which the second prompt includes feedback-based information reflecting the feedback information and a purpose of generating the sample question; and a final evaluation question generation step of, when the feedback information is positive, deriving a prompt, which has been input into the large language model that outputs a sample question for the feedback information, as a final prompt, and inputting a request for generating a plurality of final evaluation questions using the final prompt into the large language model, by the service server, wherein the purpose of generating the sample question corresponds to meta information that is transmitted to the service server by the user terminal according to a user's input, the first prompt input step includes inputting a plurality of first prompts into the large language model, each of the plurality of first prompts includes one mutually different meta information, the large language model outputs a plurality of sample questions, and outputs a sample question group including a plurality of sample question for each meta information, and the feedback transmission step includes transmitting the feedback information, which is input by the user with respect to each sample question group output for each meta information, to the service server, and wherein the second prompt input step includes inputting a plurality of second prompts into the large language model, each of the plurality of second prompts includes one mutually different meta information, and the final evaluation question generation step includes requesting the large language model to generate a plurality of final evaluation questions for each meta information using the final prompt.

2. The method of claim 1, further comprising a feedback information determination step of receiving the feedback information from the user terminal, and determining whether the feedback information is positive, by the service server, wherein the feedback transmission step, the feedback information determination step, and the second prompt input step are sequentially repeated until the positive type feedback information is received in the feedback information determination step.

3. The method of claim 2, wherein the feedback information includes any one of a positive or negative type first feedback input by the user with respect to the plurality of sample questions, and a natural language type second feedback input by the user with respect to the plurality of sample questions, and the feedback information determination step includes a feedback determination step of determining whether a natural language input by the user, which is included in the second feedback, is positive or negative by inputting the feedback information into the large language model.

4. The method of claim 1, further comprising a default-based information transmission step of transmitting default-based information to the service server according to a user's input, by the user terminal, wherein the first prompt further includes the default-based information, each of the feedback-based information and the default-based information includes instructions to be applied to the large language model and restrictions to be applied to the large language model, and the instructions and the restrictions included in the feedback-based information are updated based on the feedback information.

5. The method of claim 1, wherein the final evaluation question generation step includes requesting the large language model to generate a larger number of final evaluation questions than a number of sample questions output from the large language model, as a result of performing each of the first prompt input step and the second prompt input step.

6. A method for generating a question to evaluate a system using a deep learning-based generative model, which is performed by a service server and a user terminal, the method comprising:

a first prompt input step of inputting a first prompt into a large language model by a service server, in which the first prompt includes reference data including information related to a system using a deep learning-based generative model to be evaluated, and a purpose of generating a sample question;

a feedback transmission step of receiving the sample question, which is output from the large language model, from the service server, and transmitting feedback information input by a user with respect to the sample question to the service server, by the user terminal;

a second prompt input step of inputting a second prompt into the large language model by the service server when the feedback information is negative, in which the second prompt includes feedback-based information reflecting the feedback information and a purpose of generating the sample question; and a final evaluation question generation step of, when the feedback information is positive, deriving a prompt, which has been input into the large language model that outputs a sample question for the feedback information, as a final prompt, and inputting a request for generating a plurality of final evaluation questions using the final prompt into the large language model, by the service server, wherein the purpose of generating the sample question corresponds to meta information that is transmitted to the service server by the user terminal according to a user's input, the first prompt input step includes inputting a plurality of first prompts into the large language model, each of the plurality of first prompts includes one mutually different meta information, the large language model outputs a plurality of sample questions, and outputs a sample question group including a plurality of sample question for each meta information, and the feedback transmission step includes transmitting the feedback information, which is input by the user with respect to each sample question group output for each meta information, to the service server, wherein the method further comprises an interface output step of outputting a feedback interface, which selectively inputs one or more meta information by the user on a screen of the user terminal and inputs of feedback information about the plurality of sample questions, by the user terminal, and wherein the feedback interface includes:

a meta information selection layer including a plurality of meta information selection elements which are output such that the user selectively inputs one or more meta information about a plurality of predetermined meta information;

a meta information output layer for outputting one or more meta information selectively input by the user;

a sample question layer for outputting a sample question group for each meta information selectively input by the user; and a feedback layer for inputting feedback on the sample question group for each meta information selectively input by the user, and a sample question group corresponding to the meta information is output from the sample question layer according to a user's input for the meta information output from the meta information output layer.

* * * * *